US012602048B2

(12) United States Patent
Natori

(10) Patent No.: US 12,602,048 B2
(45) Date of Patent: Apr. 14, 2026

(54) TRAVEL ROUTE GENERATION METHOD FOR AUTONOMOUS VEHICLE AND CONTROL APPARATUS FOR AUTONOMOUS VEHICLE

(71) Applicant: HONDA MOTOR CO., LTD., Tokyo (JP)

(72) Inventor: Yoichi Natori, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 180 days.

(21) Appl. No.: 18/184,684

(22) Filed: Mar. 16, 2023

(65) Prior Publication Data

US 2024/0310836 A1 Sep. 19, 2024

(51) Int. Cl.
*G05D 1/00* (2024.01)
*G06T 7/13* (2017.01)

(52) U.S. Cl.
CPC ......... *G05D 1/0214* (2013.01); *G05D 1/0246* (2013.01); *G05D 1/0278* (2013.01); *G06T 7/13* (2017.01); *G06T 2207/30252* (2013.01)

(58) Field of Classification Search
CPC .. G05D 1/0214; G05D 1/0246; G05D 1/0278; G05D 1/0221; G05D 1/021; G05D 1/0212; G05D 1/027; G06T 7/13; G06T 2207/30252; G06T 7/10; G06T 2207/10016; G06V 20/588; G06V 20/50; G06V 20/56; G06V 20/58; B60W 2556/20; B60W 2420/403; G08G 1/123; G01C 1/00; G01C 17/00; G06N 20/00; G01S 19/40; G01S 19/42; G01S 19/53; G01S 17/931; G01S 17/89; A47L 2201/04
See application file for complete search history.

(56) References Cited

U.S. PATENT DOCUMENTS

| | | | |
|---|---|---|---|
| 2002/0099481 A1 | 7/2002 | Mori | |
| 2020/0302662 A1* | 9/2020 | Homayounfar | G06V 10/454 |
| 2020/0404846 A1* | 12/2020 | Fattey | G05D 1/0022 |
| 2021/0048817 A1* | 2/2021 | Olson | B60W 30/00 |
| 2022/0074751 A1* | 3/2022 | Klang | G06N 20/00 |
| 2022/0144325 A1* | 5/2022 | Kurz | B61L 15/0081 |
| 2022/0306197 A1* | 9/2022 | Ivanovic | B62D 6/00 |
| 2022/0308580 A1* | 9/2022 | Eade | B60W 60/00 |

FOREIGN PATENT DOCUMENTS

| | | | | |
|---|---|---|---|---|
| CN | 112180931 A | * | 1/2021 | A47L 11/24 |
| JP | 2002215236 A | | 7/2002 | |

* cited by examiner

*Primary Examiner* — Abby Lin
*Assistant Examiner* — Kayla R. Doros
(74) *Attorney, Agent, or Firm* — CKC & Partners Co. LLC

(57) ABSTRACT

Problem to be solved: Provided is a travel route generation method that is for an autonomous vehicle and enables a travel route to be accurately generated, even in a case where positioning using GPS or the like is unavailable and the boundary of a travel path is unclear.

Solution: Scene information that includes a travel path is obtained by sensing surroundings of the autonomous vehicle, a boundary of the travel path is detected based on the obtained scene information, a likelihood based on machine learning is used to evaluate the detected boundary, and a provisional travel route on the travel path for the autonomous vehicle is generated based on the boundary and in accordance with the likelihood for the boundary.

6 Claims, 14 Drawing Sheets

TRAVEL ROUTE GENERATION METHOD FOR AUTONOMOUS VEHICLE AND CONTROL APPARATUS FOR AUTONOMOUS VEHICLE

BACKGROUND OF THE INVENTION

Field of the Invention

The present invention pertains to a travel route generation method for an autonomous vehicle, and a control apparatus for an autonomous vehicle.

Related Art

Conventionally, a technique for controlling travel by an unmanned vehicle based on information regarding a road-side zone on the side of a travel path is known (for example, refer to Japanese Unexamined Patent Application, Publication No. 2002-215236). This technique uses a road-side zone distance measuring device to measure the distance from a vehicle to a road-side zone to thereby enable the current position and orientation to be obtained even in a case where GPS navigation is unavailable.

Patent Document 1: Japanese Unexamined Patent Application, Publication No. 2002-215236

SUMMARY OF THE INVENTION

However, the abovementioned conventional technique cannot generate a travel route in a case where the road-side zone, which is the boundary of the travel path, is unclear due to, inter alia, a case where the road is unpaved or in wilderness.

Accordingly, an object of the present invention is to provide a travel route generation method for an autonomous vehicle and a control apparatus for an autonomous vehicle that enable a travel route to be accurately generated, even in a case where positioning using GPS or the like is unavailable and the boundary of a travel path is unclear.

(1) A travel route generation method for an autonomous vehicle (for example, an autonomous vehicle 1 described below), the method including: obtaining, by sensing surroundings of the autonomous vehicle, scene information (for example, scene information 100 described below) that includes a travel path (for example, a travel path 101 described below); detecting a boundary (for example, a boundary 101a described below) of the travel path based on the obtained scene information; using a likelihood based on machine learning to evaluate the detected boundary; and generating, based on the boundary, a provisional travel route (for example, a provisional travel route DR1 described below) on the travel path for the autonomous vehicle, in accordance with the likelihood for the boundary.

(2) In the travel route generation method for an autonomous vehicle according to aspect (1) above, the boundary of the travel path is detected by performing segmentation on the obtained scene information.

(3) In the travel route generation method for an autonomous vehicle according to aspect (1) above, in a situation where it is possible to identify a self position of the autonomous vehicle, a normal travel route (for example, a normal travel route DR2 described below) for the autonomous vehicle to a destination (for example, a goal described below) is generated based on the identified self position, and in a poor situation for identification of the self position of the autonomous vehicle, the provisional travel route is generated based on the boundary, and the provisional travel route is corrected based on a relative angle (for example, a vector RV described below) of a direction of the destination with respect to a self position and orientation of the autonomous vehicle immediately before the poor situation for identification of the self position was entered.

(4) A control apparatus for an autonomous vehicle (for example, the autonomous vehicle 1 described below), the apparatus including: a travelable region detector (for example, a travelable region detector 7c described below) configured to detect a boundary (for example, the boundary 101a described below) of a travel path (for example, the travel path 101 described below) based on scene information (for example, the scene information 100 described below) regarding surroundings that include the travel path in relation to forward of the autonomous vehicle and is obtained by a sensor (for example, a 3D sensor 2 described below); and a travel route generator (for example, a travel route generator 7e described below) configured to generate, based on the boundary detected by the travelable region detector, a provisional travel route (for example, the provisional travel route DR1 described below) for the autonomous vehicle on the travel path, the travelable region detector using a likelihood based on machine learning to evaluate the boundary, and the travel route generator, in accordance with the likelihood regarding the boundary evaluated by the travelable region detector, generating the provisional travel route based on the boundary.

(5) In the control apparatus for an autonomous vehicle according to aspect (4) above, the travelable region detector detects the boundary of the travel path by performing segmentation on the scene information obtained by the sensor.

(6) In the control apparatus for an autonomous vehicle according to aspect (4) above, a self-position identifier (for example, a self-position identifier 7g described below) configured to identify a self position of the autonomous vehicle is further provided, and the travel route generator, in a situation where the self-position identifier can identify the self position, generates a normal travel route (for example, the normal travel route DR2 described below) to a destination (for example, a goal described below) based on the identified self position of the autonomous vehicle and, in a poor situation for identification of the self position by the self-position identifier, generates the provisional travel route based on the boundary and corrects the provisional travel route based on a relative angle (for example, the vector RV described below) of a direction of the destination with respect to a self position and orientation of the autonomous vehicle immediately before the poor situation for identification of the self position was entered.

By virtue of the travel route generation method for an autonomous vehicle according to aspect (1) above and the control apparatus for an autonomous vehicle according to aspect (4) above, a boundary of a travel path is detected based on scene information obtained by sensing the travel path, a likelihood based on machine learning is used to evaluate the detected boundary, and a provisional travel route that follows the boundary is generated in accordance with the likelihood for the boundary. Therefore, it is possible to accurately generate a travel route that follows the boundary, even in a case where the boundary of the travel path is unclear. Accordingly, for example, even in a case where it is not possible to identify a self position of an autonomous vehicle, the autonomous vehicle can safely continue to travel autonomously by following the boundary of the travel path.

By virtue of the travel route generation method for an autonomous vehicle according to aspect (2) above and the control apparatus for an autonomous vehicle according to aspect (5) above, segmentation is performed on scene information, whereby it is possible to more clearly detect a boundary of a travel path.

By virtue of the travel route generation method for an autonomous vehicle according to aspect (3) above and the control apparatus for an autonomous vehicle according to aspect (6) above, even in a poor situation for an autonomous vehicle to identify a self position, it is possible to address establishing both of ensuring safety by advancing following a boundary and efficiently moving to a destination.

DETAILED DESCRIPTION OF THE INVENTION

With reference to the drawings, description in detail is given below regarding a travel route generation method for an autonomous vehicle and a control apparatus for an autonomous vehicle, according to the present embodiment.

An autonomous vehicle travels autonomously on a travel path, following a generated travel route, without involving a determination by a human. A conveyance carriage is exemplified as a specific autonomous vehicle. An autonomous vehicle may be manned or unmanned. An autonomous vehicle 1 according to the present embodiment is illustrated as a four-wheeled vehicle, but an autonomous vehicle may be a three-wheeled vehicle or may be a multi-wheeled vehicle that has six or more wheels. An autonomous vehicle may be a tracked vehicle. In the present embodiment, description is given by taking, as an example, a case where an autonomous vehicle travels on a travel path that is mainly an unpaved road as in wilderness. However, that is not to say that cases where an autonomous vehicle travels on a typical paved road are excluded.

Figure 1:
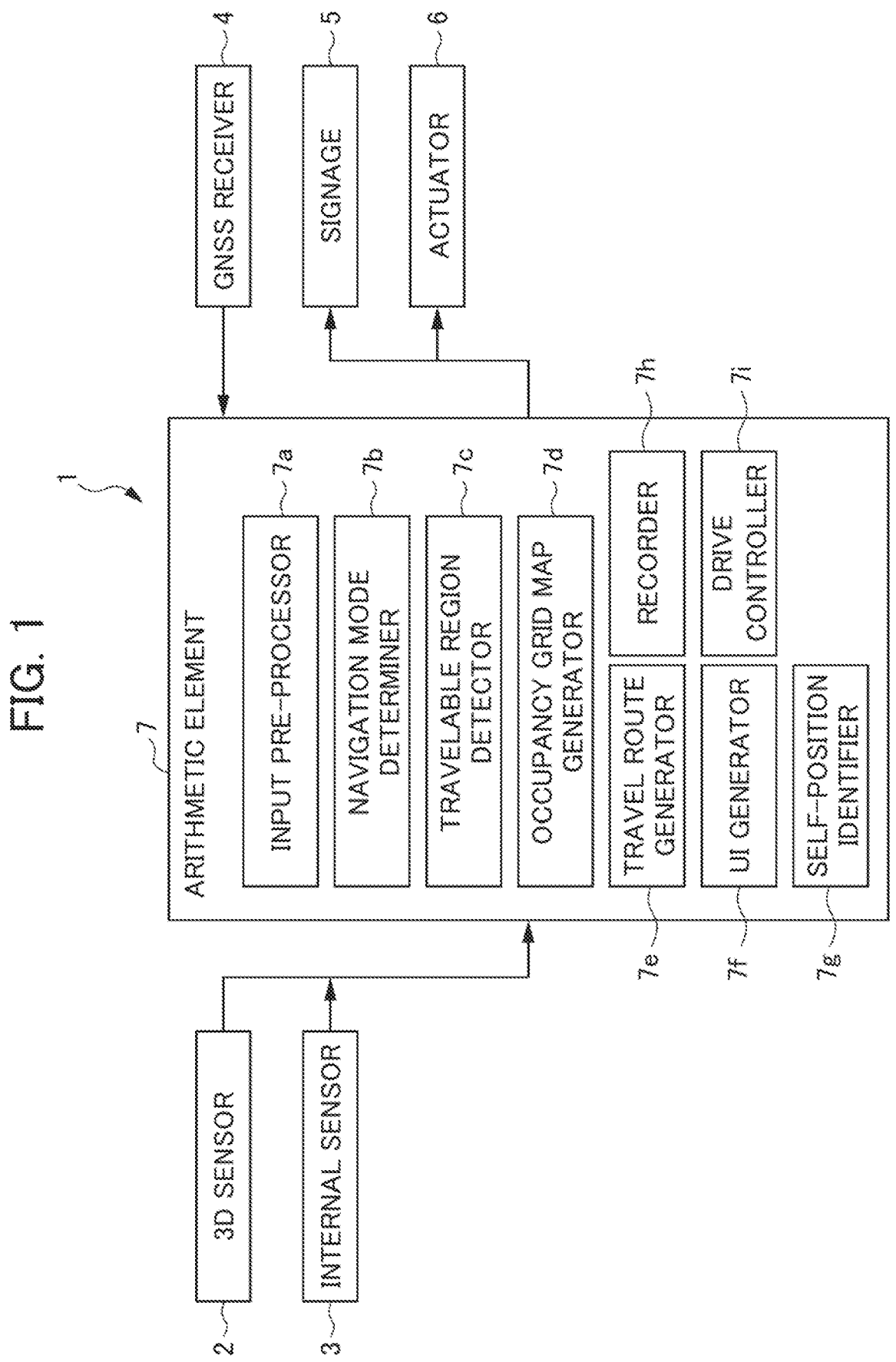
FIG. 1 is a functional block diagram that illustrates an approximate configuration of an autonomous vehicle.

As illustrated in FIG. 1, the autonomous vehicle 1 includes a 3D sensor 2, an internal sensor 3, a GNSS receiver 4, signage 5, an actuator 6, and an arithmetic element 7.

The 3D sensor 2 is a sensing apparatus that obtains scene information such as an image or point cloud that includes a travel path in relation to forward in the direction of travel by the autonomous vehicle 1. The 3D sensor 2 obtains, at a predetermined sampling cycle Sf (refer to FIG. 3), 3D scene information for surroundings that include a travel path in relation to forward in the direction of travel by the autonomous vehicle 1. A depth camera (a camera having a depth measurement sensor), a light detection and ranging (LiDAR) device, an imaging radar, or the like is exemplified as a specific 3D sensor 2. Scene information that includes a travel path and is obtained by the 3D sensor 2 is inputted to the arithmetic element 7.

The internal sensor 3 measures travel states such as a movement speed, direction of movement, and movement distance for the autonomous vehicle 1. An inertial measurement unit (IMU), a wheel encoder, or the like is exemplified as a specific internal sensor 3. A detection signal from the internal sensor 3 is inputted to the arithmetic element 7.

The GNSS receiver 4, via an antenna (not illustrated) provided on the autonomous vehicle 1, receives positioning information from a global navigation satellite system (GNSS) such as the Global Positioning System (GPS) which uses artificial satellites. The positioning information received by the GNSS receiver 4 is inputted to the arithmetic element 7.

The signage 5 is a display unit that belong to the autonomous vehicle 1 and performs displays for outside of the vehicle. In addition to a display or touch panel that enables interaction by a user, the signage 5 includes headlamps, direction indicators, brake lights, and the like. Each element in the signage 5 operates in accordance with an instruction from the arithmetic element 7.

The actuator 6 causes the autonomous vehicle 1 to travel. The actuator 6 includes such as a motor for travel and changing directions. Each element in the actuator 6 operates in accordance with an instruction from the arithmetic element 7.

The arithmetic element 7 is an autonomous navigation arithmetic element for the autonomous vehicle 1 to travel autonomously, and configures a control apparatus for the autonomous vehicle 1. The arithmetic element 7 is configured by including functional blocks: an input pre-processor 7a, a navigation mode determiner 7b, a travelable region detector 7c, an occupancy grid map generator 7d, a travel route generator 7e, a UI generator 7f, a self-position identifier 7g, a recorder 7h, and a drive controller 7i.

The input pre-processor 7a performs various pre-processing, such as noise filtering, on scene information inputted from the 3D sensor 2.

The navigation mode determiner 7b monitors a sensitivity at which positioning information is received by the GNSS receiver 4, and determines a self-position identification status from a reception status regarding the positioning information. Specifically, in a case where the autonomous vehicle 1 is able to receive positioning information from a GNSS at a normal sensitivity, the autonomous vehicle 1 is able to identify a self position on a map. Accordingly, the navigation mode determiner 7b determines that the self-position identification status is good. In contrast, in a case where it is not possible to receive positioning information from the GNSS at a normal sensitivity due to the autonomous vehicle 1 traveling in a location where it is difficult for radio waves to reach such as between tall ferro-concrete buildings, the autonomous vehicle 1 enters a lost state in which it is not possible to identify a self position on a map. Accordingly, the navigation mode determiner 7b determines that the self-position identification status is poor. The navigation mode determiner 7b determines the self-position identification status at a predetermined cycle after the autonomous vehicle 1 starts operating.

From pre-processed scene information obtained from the input pre-processor 7a, the travelable region detector 7c detects a boundary of a travel path included in the scene information. A "boundary" for a travel path is a boundary between a travel path and that which is not the travel path, in other words a boundary between a region in which the autonomous vehicle 1 can travel and a region in which the autonomous vehicle 1 cannot travel.

Figure 2:
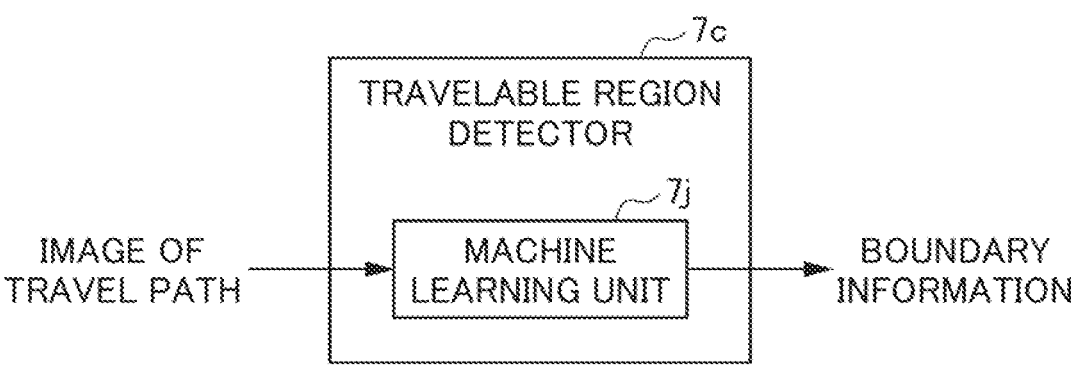
FIG. 2 is a block view for describing operation by a travelable region detector.

As illustrated in FIG. 2, the travelable region detector 7c includes a machine learning unit 7j. The travelable region detector 7c, in the machine learning unit 7j, uses machine learning to discriminate a boundary of a travel path from the scene information that includes a travel path, and generates boundary information. For example, the machine learning unit 7j can use supervised learning, which uses correct answer data, to detect a boundary of a travel path from scene information that is in regard to the travel path and is obtained by the 3D sensor 3. The correct answer data is data resulting from prior labeling of, inter alia, a travel path, plants, and the sky in a large amount of scene information that includes various travel paths that are, inter alia, off-road or in urban areas.

Figures 3, 4:
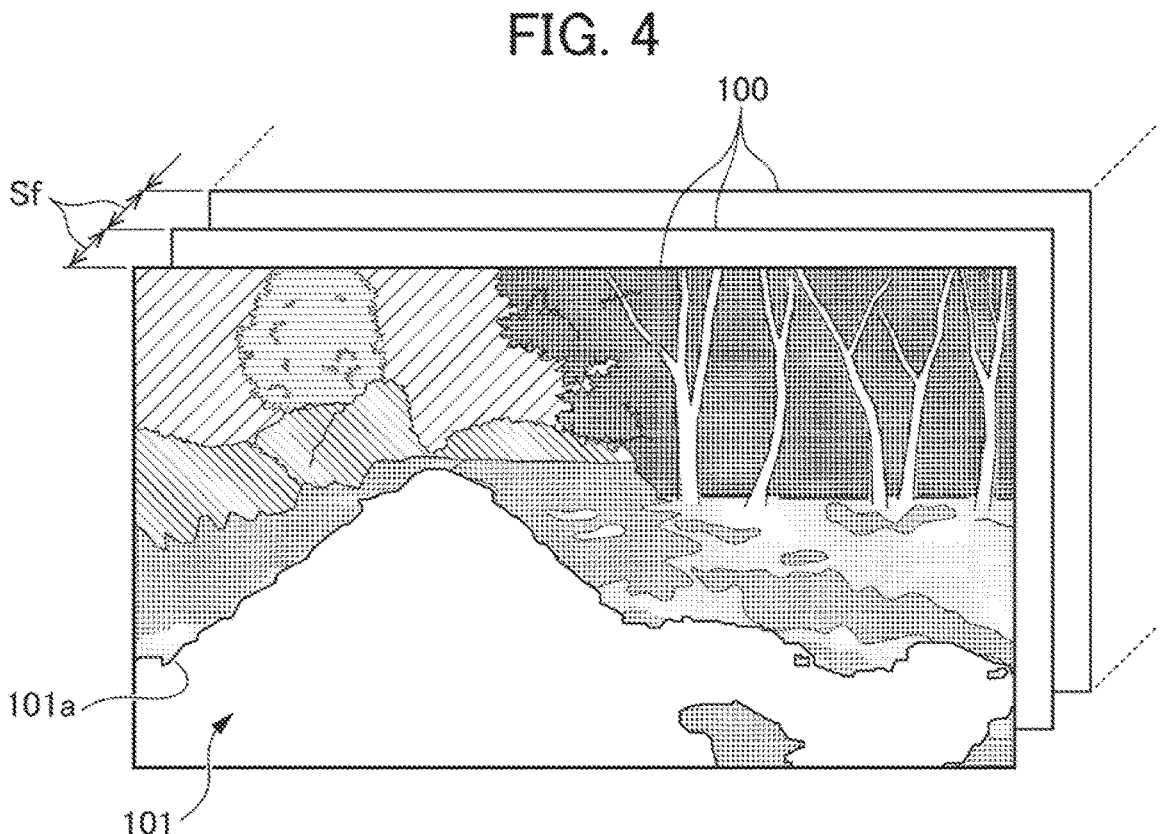
FIG. 3 is a view that illustrates an example of sensing information that includes a travel path.
FIG. 4 is a view for describing a state resulting from detecting a boundary of a region that can be traveled through from the sensing information that includes the travel path.

In detail, for each one frame's worth of scene information that includes a travel path and is successively obtained at a predetermined sampling cycle Sf by the 3D sensor 2, the travelable region detector 7c performs segmentation, and labels each pixel or point cloud included in the scene information to thereby detect a boundary of a travel path. Specifically, as illustrated in FIG. 3, in a case of detecting a boundary of a travel path based on image information 100 that is for one frame, the image information 100 including a travel path 101, plants 102, and sky 103, and being employed as scene information, the travelable region detector 7c performs labeling after using machine learning to discriminate whether each pixel in the image information 100 for one frame is a pixel of the travel path or a pixel for something that is not a travel path, such as plants or the sky, using segmentation. As a result, it is possible to detect, from the image information 100, a region for a travel path 101 on which the autonomous vehicle 1 can travel, such as a region indicated in white in FIG. 4. Edges of this travel path 101 indicate boundaries 101a. Segmentation is executed for each item of scene information that is for one frame and is successively obtained by the 3D sensor 2.

In this manner, the travelable region detector 7c, in the machine learning unit 7j, detects a boundary of a travel path from scene information using segmentation to thereby be able to accurately detect a boundary of a travel path, even from scene information for wilderness in which a region for a travel path is not clearly distinguished from regions that are not travel paths, as illustrated in FIG. 3. Specific segmentation is not particularly limited. Segmentation may by one of semantic segmentation, instance segmentation, and panoptic segmentation, for example. In addition, the machine learning unit 7j is not limited to performing supervised learning. The machine learning unit 7j may use unsupervised learning to generate boundary information for a travel path, from each item of scene information.

Figure 5A:
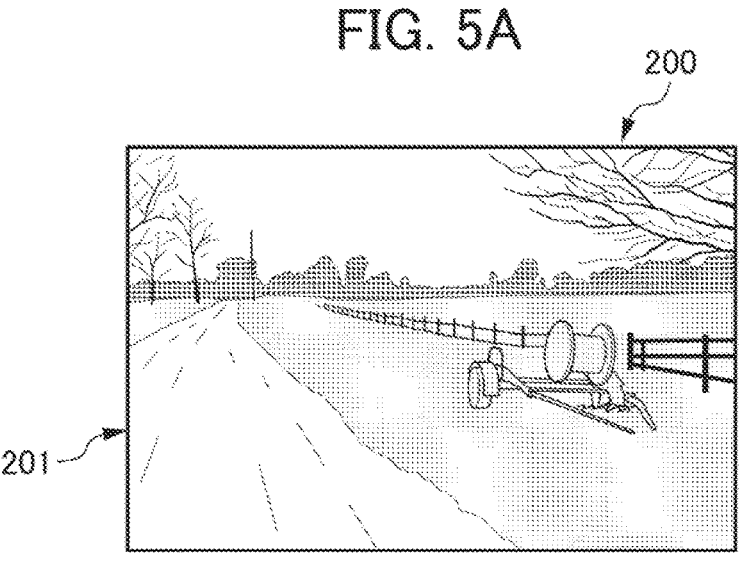
FIG. 5A is a view that illustrates another example of sensing information that includes a travel path.
Figure 5B:
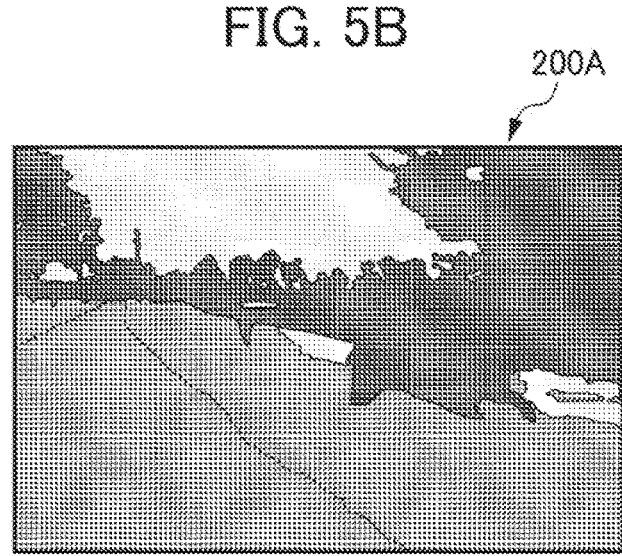
FIG. 5B is a view that illustrates an example of evaluating a likelihood for a boundary of a region that can be traveled through and is detected from sensing information that includes the travel path illustrated in FIG. 5A.
Figure 5C:
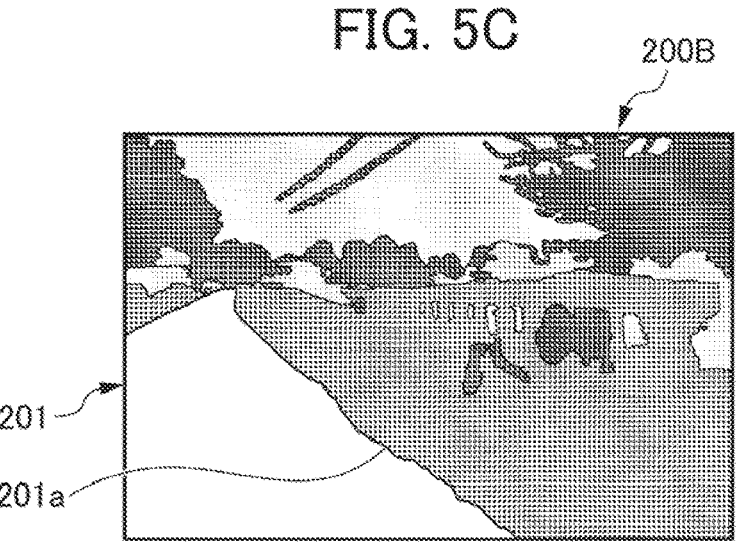
FIG. 5C is a view that illustrates another example of evaluating a likelihood for a boundary of a region that can be traveled through and is detected from sensing information that includes the travel path illustrated in FIG. 5A.

When detecting a boundary of a travel path from scene information, the travelable region detector 7c adds a score to each boundary detection result to thereby evaluate the likelihood (reliability) of a detected boundary. For example, in a case where a result of detecting a boundary using machine learning in relation to scene information 200 that includes a travel path 201 as illustrated in FIG. 5A is that the boundary is not necessarily clear as in scene information 200A illustrated in FIG. 5B, a likelihood for the boundary is evaluated to be relatively low. In contrast, in a case where a boundary 201a for the travel path 201 is clear as in scene information 200B illustrated in FIG. 5C, a likelihood for the boundary is evaluated to be relatively high. Such boundary likelihoods are determined using a degree of similarity or degree of correlation between a boundary detected in accordance with machine learning and using segmentation, and training data which is correct answer data.

Figure 6:
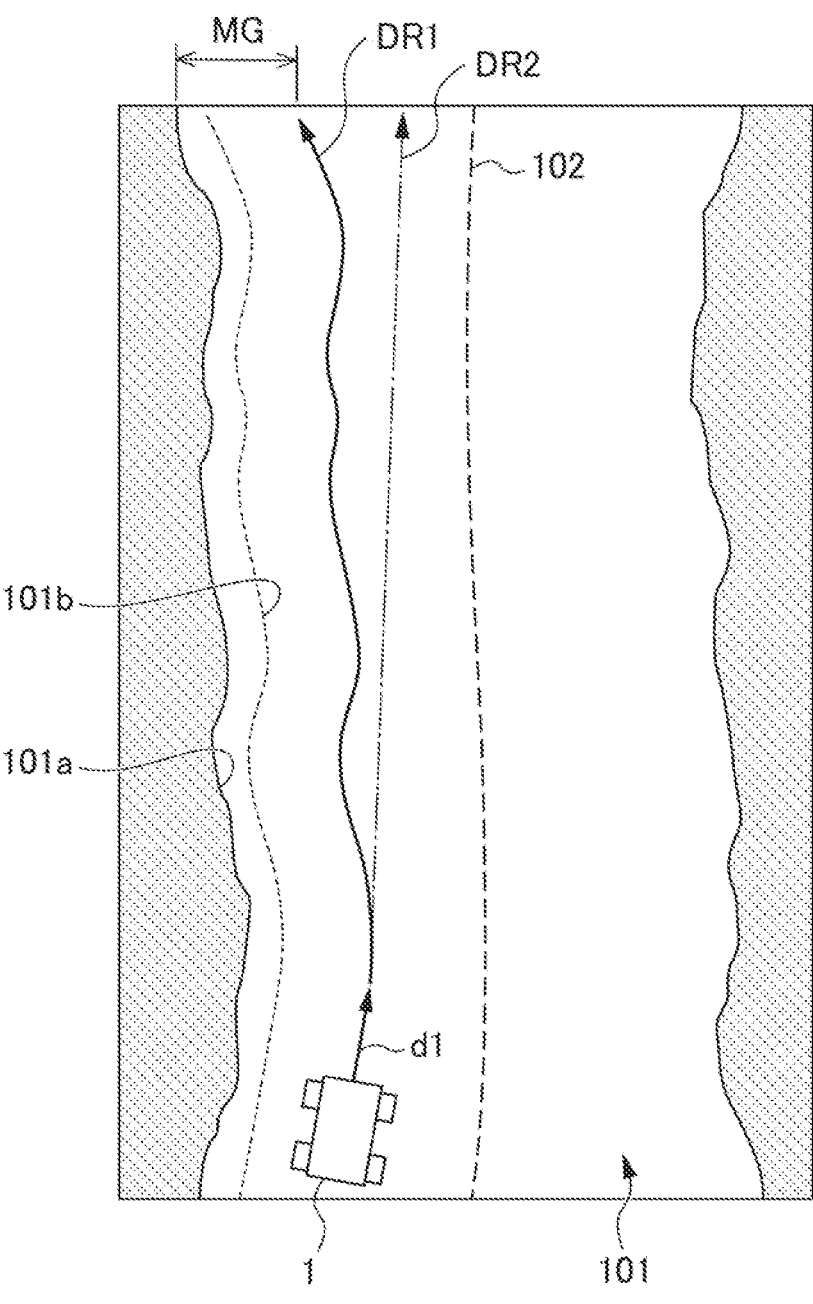
FIG. 6 is a schematic view that illustrates an example of a normal travel route and a provisional travel route for an autonomous vehicle.

In a case where a boundary of a travel path has an uneven shape such as sharp curves, the travelable region detector 7c may generate information for such a boundary in order to achieve a boundary having smooth curves using a spline curve 101b as illustrated in FIG. 6. As a result, in the travel route generator 7e, which is described below, it is possible to generate a provisional travel route which bends smoothly and on which the autonomous vehicle 1 can travel smoothly.

The occupancy grid map generator 7d generates an occupancy grid map based on scene information in which a boundary of a travel path has been detected by the travelable region detector 7c. An occupancy grid map is a result of dividing scene information into a grid, and holding a probability that there is an obstacle in each grid cell. As a result, whether or not there is a parked vehicle or another obstacle on the travel path is detected.

The travel route generator 7e generates a travel route that is on a travel path and is for the autonomous vehicle 1 to head toward a destination. The travel route generator 7e generates two types of travel routes: a provisional travel route DR1 and a normal travel route DR2.

In a case where, for example, the autonomous vehicle 1 cannot identify a self position based on received positioning information as in a situation where there is poor reception of positioning information in the GNSS receiver 4, a provisional travel route DR1 is provisionally generated until it is possible to receive positioning information again. In this case, as illustrated in FIG. 6, the travel route generator 7*e* generates a provisional travel route DR1 for the autonomous vehicle 1 to travel by following a boundary 101*a*, which is for a travel path 101 detected from each item of scene information by the travelable region detector 7*c*. If performance by the travelable region detector 7*c* is stable, the provisional travel route DR1 corresponds to a result of joining together the direction of travel by the autonomous vehicle 1 each sampling cycle Sf. In FIG. 6, d1 is a direction indicated by the provisional travel route DR1 each sampling cycle Sf. This direction d1 indicates the direction of travel by the autonomous vehicle 1 each sampling cycle Sf. In a case where the boundary 101*a* is generated using the smooth spline curve 101*b*, the provisional travel route DR1 is supplemented such that the provisional travel route DR1 becomes a smooth route that follows the spline curve 101*b*.

The provisional travel route DR1 is successively updated to the latest route each time scene information for one frame is obtained at the predetermined sampling cycle Sf. However, it may be that the provisional travel route DR1 is not updated in a case where, between a provisional travel route DR1 generated from scene information for one frame and a provisional travel route DR1 generated from a scene information for the previous frame therefor, there is no deviation greater than or less than a preset range for amounts of deviation. As a result, stable operation by the autonomous vehicle 1 is possible.

FIG. 6 illustrates a case in which the autonomous vehicle 1 keeps to the left side of the travel path 101. In this case, the travel route generator 7*e* generates the provisional travel route DR1 such that the provisional travel route DR1 follows the boundary 101*a* which is on the left side of the travel path 101. A center line 102 is illustrated on the travel path 101. The center line 102 is estimated from a region that can be traveled through and was detected by the travelable region detector 7*c*.

The travel route generator 7*e* may form the provisional travel route DR1 close to the boundary 101*a*, or may form the provisional travel route DR1 at positions that are separated from the boundary 101*a* by a predetermined distance. In other words, the travel route generator 7*e* may generate a provisional travel route DR1 so as to form a predetermined safety margin MG for separating the boundary 101*a* and the provisional travel route DR1, as illustrated in FIG. 6. As a result, it is possible to further increase robustness with respect to safety when the autonomous vehicle 1 is traveling autonomously.

The size of this safety margin MG may be a fixed value or a variable value. In a case where the size of the safety margin MG is made to be a variable value, the travelable region detector 7*c* can set the size of the safety margin MG in response to a likelihood (a value for the score) for the boundary 101*a* in a case where the boundary 101*a* for the travel path 101 is detected. In other words, in a case where the likelihood for the boundary 101*a* is low (a case where the value for the score is low), the travel route generator 7*e* sets the safety margin MG to be relatively large. As a result, it is possible to reduce the risk that the autonomous vehicle 1 will unexpectedly cross over the boundary 101*a*. In contrast, in a case where the likelihood for the boundary 101*a* is high (a case where the value for the score is high), the travel route generator 7*e* sets the safety margin MG to be relatively low. As a result, the autonomous vehicle 1 travels at positions that are close to the boundary 101*a*, and thus it is possible to reduce a risk of colliding with another vehicle such as an oncoming vehicle.

The normal travel route DR2 is generated in a case where the autonomous vehicle 1 is in a situation where the self position can be identified, such as a situation where there is good reception of positioning information in the GNSS receiver 4, for example. FIG. 6 illustrates the normal travel route DR2 by a dot-dash line on the travel path 101. The normal travel route DR2 is a travel route from the current location to a destination and is generated based on a positional relationship on a map between the self position of the autonomous vehicle 1 and the destination. This normal travel route DR2 is generated using a normal navigation process that uses positioning information in accordance with the GNSS receiver 4, and thus detailed description is omitted.

The UI generator 7*f* generates a command for operating a user interface belonging to the autonomous vehicle 1. A user interface belonging to the autonomous vehicle 1 includes a display or touch panel in the autonomous vehicle 1 as well as, inter alia, headlamps, direction indicators, and brake lights.

The self-position identifier 7*g* identifies a self position and orientation of the autonomous vehicle 1 with respect to a map, based on positioning information received by the GNSS receiver 4. The self-position identifier 7*g* can also identify a self position and orientation of the autonomous vehicle 1 on a map, based on state information that is regarding the autonomous vehicle 1 and is obtained by the internal sensor 3. In a case where a LiDAR device or a camera is used as the 3D sensor 2, the self-position identifier 7*g* may identify a self position and orientation of the autonomous vehicle 1 on a map based on information sensed using the LiDAR device or the camera. Identification of a self position and orientation of the autonomous vehicle 1 in the self-position identifier 7*g* continues to be performed at a predetermined cycle while the autonomous vehicle 1 is operating. Each time the self-position identifier 7*g* identifies a self position and orientation of the autonomous vehicle 1, the self-position identifier 7*g* saves the self position and orientation in the recorder 7*h*.

The recorder 7*h* records and saves various items of information which are needed for the autonomous vehicle 1 to operate, such as information that includes a likelihood pertaining to a boundary of a travel path detected by the travelable region detector 7*c*, information regarding the provisional travel route DR1 and the normal travel route DR2 generated by the travel route generator 7*e*, information that is regarding obstacles in the travel path 101 and is generated by the occupancy grid map generator 7*d*, information regarding a self position and orientation that are for the autonomous vehicle 1 and were identified by the self-position identifier 7*g*, and map information. The orientation of the autonomous vehicle 1 is an azimuth for the forward direction of the autonomous vehicle 1.

The drive controller 7*i* controls operation by drive units which are for causing the autonomous vehicle 1 to travel.

The arithmetic element 7 is configured by an arithmetic processing apparatus such as a central processing unit (CPU) or general-purpose computing on graphics processing unit (GPGPU). The arithmetic element 7 can be provided with an auxiliary storage apparatus such as a hard disk drive (HDD) or solid-state drive (SSD) that stores various types of control programs such as application software for realizing functionality for each functional block described above or an operating system (OS), or a main storage apparatus such as a random-access memory (RAM) for storing data that is temporarily necessary in order for the arithmetic processing apparatus to execute a program.

Figure 7:
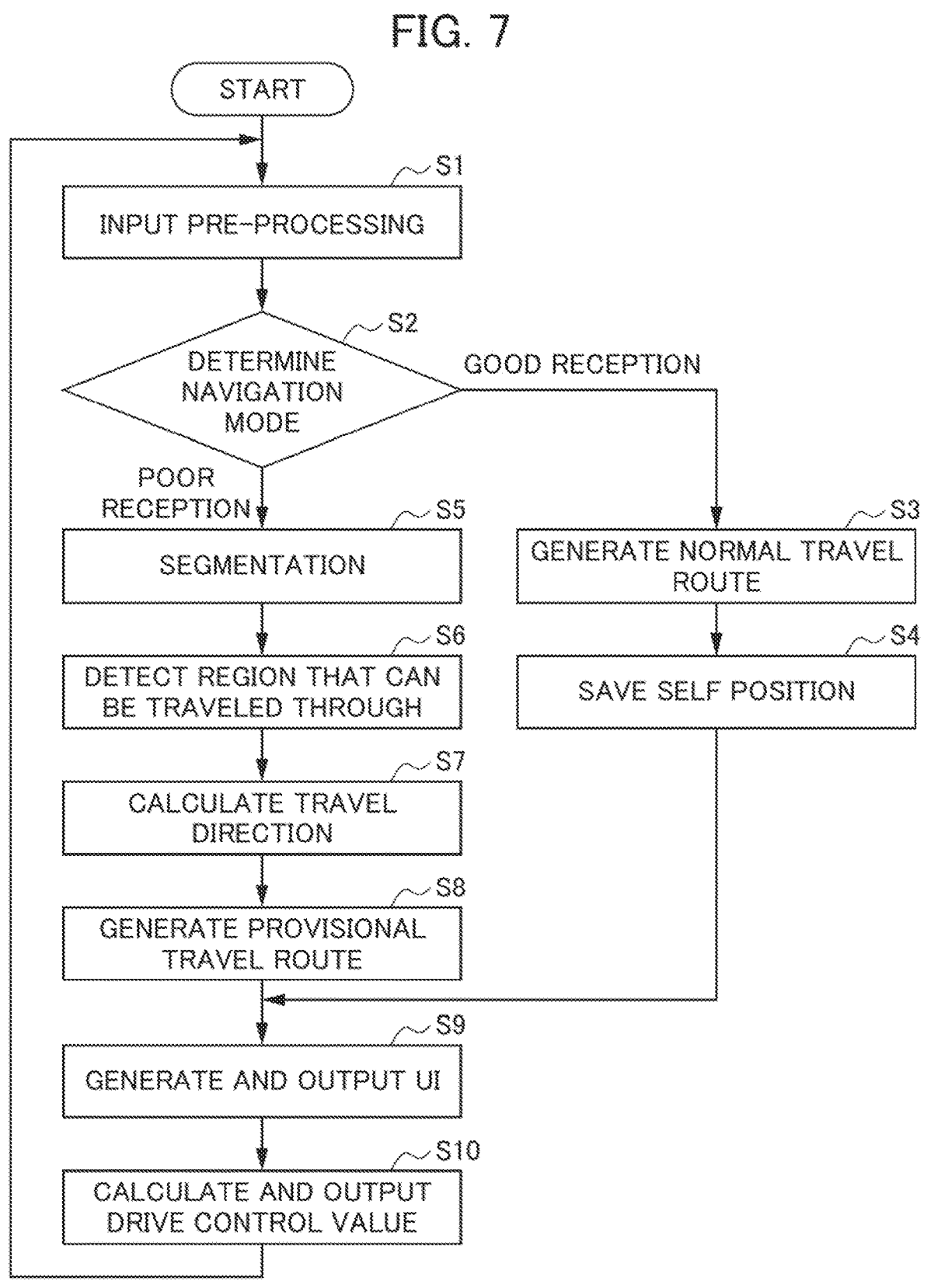
FIG. 7 is a flow chart for describing an operation by a control apparatus for an autonomous vehicle.

Next, using a flow chart illustrated in FIG. 7, description is given regarding control for generating a travel route in the autonomous vehicle 1. Description is given below regarding a case in which the autonomous vehicle 1 identified a self position and orientation based on the internal sensor 3 and positioning information received by the GNSS receiver 4.

After the autonomous vehicle 1 starts operating, the arithmetic element 7 performs input pre-processing, such as noise filtering, in the input pre-processor 7*a*, with respect to scene information that is for one frame and is obtained from the 3d sensor 2 which performs sensing at the predetermined sampling cycle Sf (step S1).

After the input pre-processing, the arithmetic element 7, in the navigation mode determiner 7*b*, determines whether the autonomous vehicle 1 is in a good situation or a poor situation for self-position identification, from a reception state for positioning information by the GNSS receiver 4 (step S2).

In a case where it is determined in step S2 that the autonomous vehicle 1 is in a good situation for self-position identification, the arithmetic element 7 generates the normal travel route DR2 in the travel route generator 7*e*, based on the positional relationship between the self position of the autonomous vehicle 1 identified by the self-position identifier 7*g* on a map, and a destination which is preset and is on the map (step S3). After the normal travel route DR2 is generated, the arithmetic element 7 saves information regarding the self position in the recorder 7*h* each time the self position of the autonomous vehicle 1 is identified (step S4). Subsequently, the processing transitions to step S9. Processing from step S9 is described below.

In contrast, in a case where it is determined in step S2 that the autonomous vehicle 1 is in a poor situation for self-position identification, the arithmetic element 7, in the travelable region detector 7*c*, executes segmentation on scene information obtained from the 3D sensor 2 (step S5), and uses machine learning to detect a travel path which is a region that can be traveled through and is included in the scene information. Furthermore, the travelable region detector 7*c* detects a boundary 101*a* for a detected travel path 101, as illustrated in FIG. 6 (step S6). Information regarding the boundary 101*a* for the travel path 101 obtained as a result also includes information regarding a boundary likelihood evaluated in accordance with a degree of similarity or a degree of correlation with respect to training data, the likelihood being a result of machine learning.

After the boundary of the travel path is detected in the travelable region detector 7*c*, the arithmetic element 7, in the travel route generator 7*e*, treats the current forward direction of the autonomous vehicle 1 as a direction of travel (step S7). Note that the self position and orientation of the autonomous vehicle 1, which has entered the lost state, are successively updated using information obtained by the internal sensor 3, based on reliable position information regarding the autonomous vehicle 1 from immediately before the lost state was entered. Accordingly, the autonomous vehicle 1 can record a movement trajectory even while lost.

Figure 8:
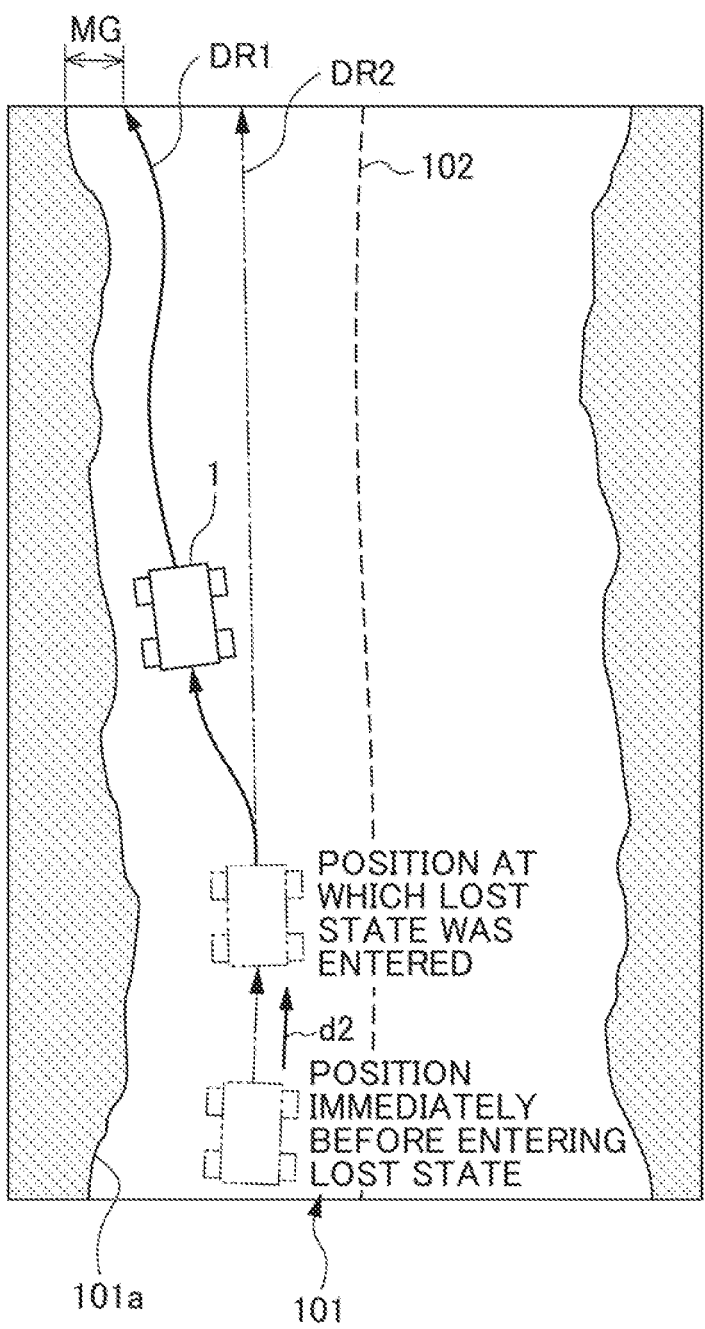
FIG. 8 is a schematic view that illustrates an example of operation when the autonomous vehicle has entered a lost state.

Subsequently, in the travel route generator 7*e* and based on these items of information, as illustrated in FIG. 8, the arithmetic element 7 generates the provisional travel route DR1 following the boundary 101*a* for the travel path 101 detected from a forward region that can be traveled through at the position where the autonomous vehicle 1 entered the lost state (step S8). The provisional travel route DR1 is generated such that the provisional travel route DR1 follows the boundary 101*a* of the travel path detected by the travelable region detector 7*c* and to also be separated from the boundary 101*a* by a predetermined safety margin MG which corresponds to the likelihood of the boundary 101*a*. Note that, as illustrated in the drawings, before entering a lost state, the autonomous vehicle 1 travels in a direction d2 that follows the normal travel route DR2.

After generation of the normal travel route DR2 in step S3 or after generation of the provisional travel route DR1 in step S8, if necessary, the arithmetic element 7, in the UI generator 7*f*, generates and outputs a command for operating a user interface in the autonomous vehicle 1 such as a direction indicator (step S9), and, in the drive controller 7*i*, also calculates and outputs a control value for performing drive control of, inter alia, each motor for causing the autonomous vehicle 1 to travel (step S10).

Subsequently, the arithmetic element 7 loops processing from step S1 through step S10 while the autonomous vehicle 1 is operating. Accordingly, as long as a poor situation for self-position identification continues, the autonomous vehicle 1 repeats processing for obtaining scene information for one frame at the predetermined sampling cycle Sf, generating the provisional travel route DR1 based on the detected boundary 101*a*, and traveling by following the provisional travel route DR1. In a case where, while the autonomous vehicle 1 is traveling by following the provisional travel route DR1, it is determined that a good situation for self-position identification has been entered due to the GNSS receiver 4 becoming able to receive positioning information again in step S2, the arithmetic element 7 does not transition to the processing in step S5 through step S8, and the autonomous vehicle 1 travels autonomously by following the normal travel route DR2 which is based on a normal navigation operation.

In this manner, in a case where, while the autonomous vehicle 1 is operating, it is determined that there is good situation for identification in which it is possible to identify the self position using positioning information received in the GNSS receiver 4, the normal travel route DR2 is generated using a normal navigation operation, and autonomous travel to the destination is possible. In contrast, even in a case where it is determined that there is a poor situation for identification of self position in which there is poor reception of positioning information in the GNSS receiver 4, it is possible to detect the boundary 101*a* of the travel path 101 based on scene information obtained from the 3D sensor 2. As a result, even in a case where a boundary of a travel path in the scene information is unclear, it is possible to generate an accurate provisional travel route DR1 that follows the boundary 101*a*. Because the provisional travel route DR1 is generated such that the provisional travel route DR1 is separated from the boundary 101*a* in accordance with a likelihood that is based on machine learning, the autonomous vehicle 1 can safely continue autonomous travel by following the boundary 101*a* for the travel path 101.

Figure 9:
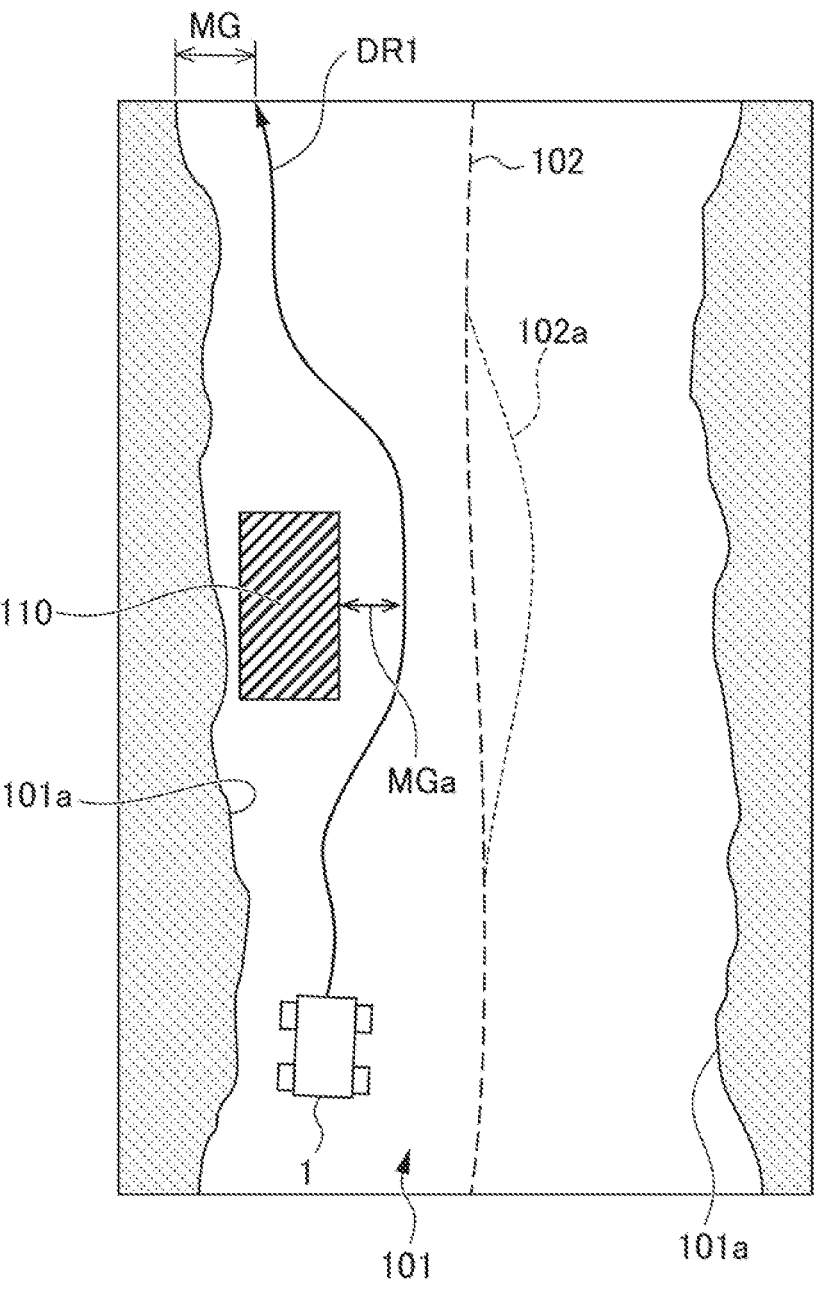
FIG. 9 is a schematic view that illustrates an example of a provisional travel route for the autonomous vehicle in a case where there is an obstacle on a travel path.

The arithmetic element 7 can determine whether there is an obstacle on a travel path from an occupancy grid map generated by the occupancy grid map generator 7*d*. For example, in a case where there is an obstacle 110 such as a parked vehicle adjacent to the boundary 101*a* for the travel path 101 as illustrated in FIG. 9, the arithmetic element 7 can recognize the presence of the obstacle 110 from the occupancy grid map. In this case, the arithmetic element 7, in the travel route generator 7e, can generate the provisional travel route DR1 such that the provisional travel route DR1 avoids and bypasses the obstacle 110. In this case, the travel route generator 7e may also generate the provisional travel route DR1 such that the provisional travel route DR1 is separated from the boundary 101a and the obstacle 110 by a predetermined safety margin. A safety margin MG for avoiding the obstacle 110 may be set to a value different to the abovementioned safety margin MG, as a safety margin MGa that is for avoiding obstacles and is illustrated in FIG. 9.

The travelable region detector 7c treats the widest region from among the region detected as the travel path 101 in the scene information as a travel path (road). The travel route generator 7e generates the provisional travel route DR1 by estimating that the center of the travel path is the center line 102. However, the travel route generator 7e estimates the center line 102 such that there is no impact from whether or not there is an obstacle 110. As a result, as illustrated in FIG. 9, in a case where the obstacle 110 is present on the travel path 101, configuration is taken to avoid a situation in which an estimated center line 102a protrudes into a side for an opposite lane due to the center of a region between the obstacle 110 and a boundary 101a on the side opposite to the obstacle 110 being regarded as the center line 102a.

The arithmetic element 7, in the travelable region detector 7c, can, based on the width of the travel path 101, determine that a region on the right side of the center line 102 is an oncoming lane. The arithmetic element 7, in the travelable region detector 7c, estimates the width of region the autonomous vehicle 1 can travel through, based on the center line 102 calculated from the width of the travel path 101. In a case where the estimated width is less than or equal to the width of the autonomous vehicle 1+the safety margin MG, in order to avoid a collision with an oncoming vehicle or the like, the arithmetic element 7 can determine that the autonomous vehicle 1 cannot travel and perform a process for stopping the autonomous vehicle 1. In addition, the arithmetic element 7 may cause a travel operation by the autonomous vehicle 1 that avoids the obstacle 110 to continue after confirming the safety of the opposite lane by using, inter alia, the 3D sensor 2 to recognize an oncoming vehicle or the like.

Figure 10:
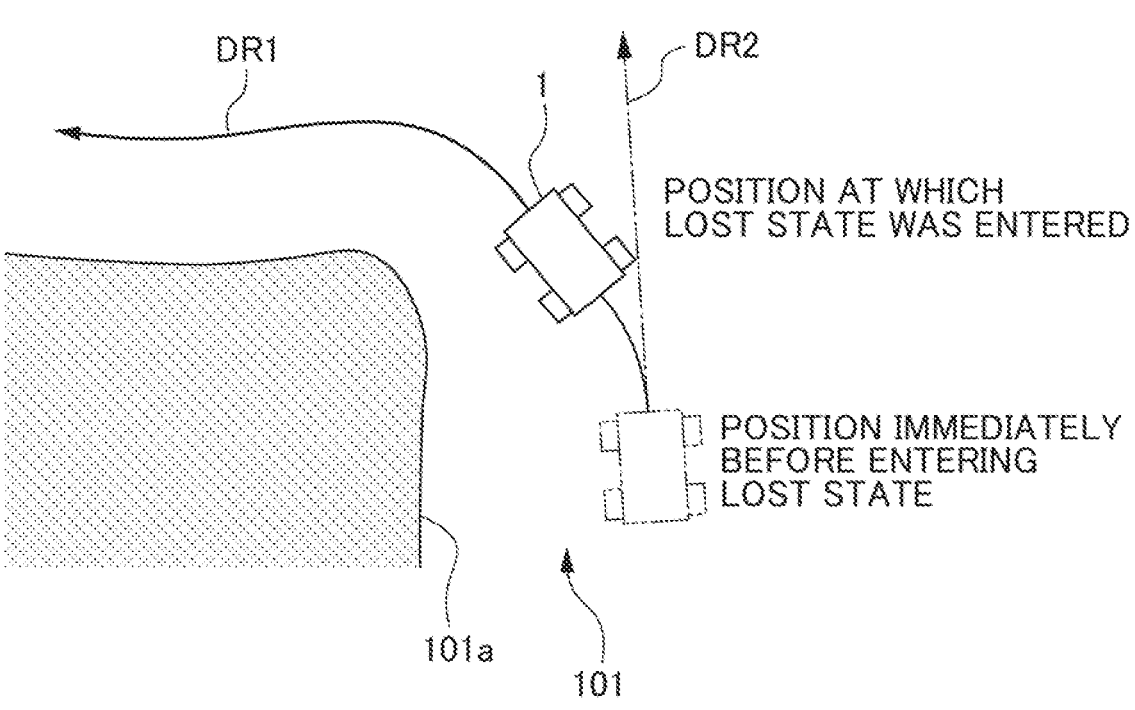
FIG. 10 is a schematic view that illustrates another example of a provisional travel route when the autonomous vehicle has entered a lost state.
Figure 11:
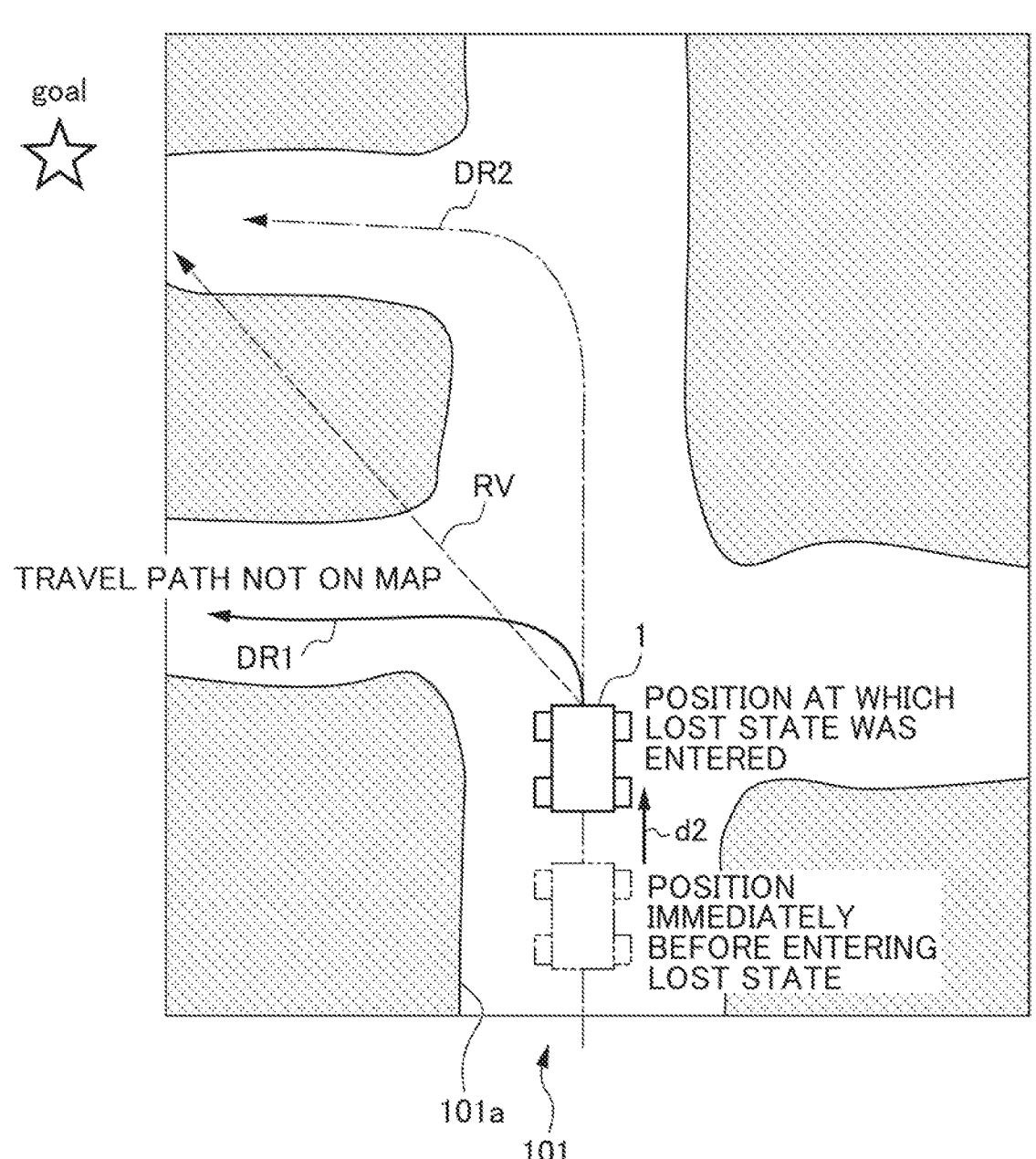
FIG. 11 is a schematic view that illustrates yet another example of a provisional travel route when the autonomous vehicle has entered a lost state.
Figure 12:
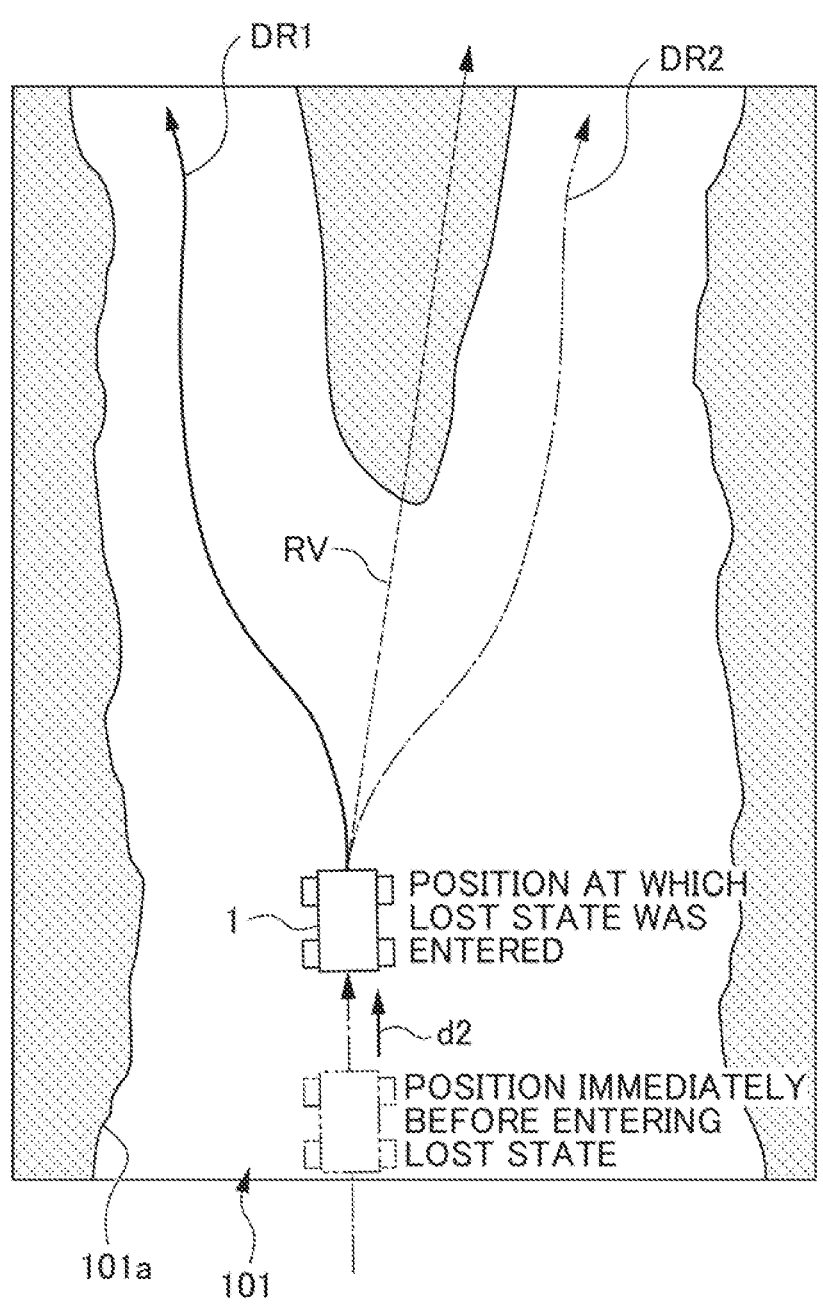
FIG. 12 is a schematic view that illustrates yet another example of a provisional travel route when the autonomous vehicle has entered a lost state.

Incidentally, in a case where the autonomous vehicle 1 has entered the lost state while traveling by following the normal travel route DR2, the arithmetic element 7 treats the forward direction of the autonomous vehicle 1 at the position when the lost was entered as the direction of travel, and generates the provisional travel route DR1 such that the autonomous vehicle 1 moves by following the boundary 101a for the travel path 101 detected from a region that can be traveled through in the surroundings. Accordingly, for example, in a case where the boundary 101a detected by the travelable region detector 7c is formed curving to the left away from the normal travel route DR2 as illustrated in FIG. 10, the provisional travel route DR1 is generated such that the provisional travel route DR1 curves to the left by following the boundary 101a. This is in order for the autonomous vehicle 1 to be able to stably travel autonomously, due to regarding the travel path 101 detected from the region that can be traveled through in the surroundings of the autonomous vehicle 1 and is detected by the 3D sensor 2 as true. As a result, for example, even in a case where a travel path 101 that is not on a map is present forward as illustrated in FIG. 11 or in a case where a plurality of similar travel paths 101 are present forward as with a Y junction as illustrated in FIG. 12, the autonomous vehicle 1 can travel autonomously by following the generated provisional travel route DR1. Accordingly, robustness for when the autonomous vehicle 1 is traveling improves.

However, the provisional travel route DR1 may greatly deviate from the direction of a destination (goal) as illustrated in FIG. 11 and FIG. 12. In such case, there is a risk that the autonomous vehicle 1 will greatly move away from the destination. Accordingly, it is desirable for the arithmetic element 7, in the travel route generator 7e, to correct the provisional travel route DR1 such that provisional travel route DR1 heads toward the direction of the destination.

In detail, based on a vector RV (refer to FIG. 11 and FIG. 12) indicating a relative angle of the direction of the destination with respect to the current position and orientation of the autonomous vehicle 1 and information from the internal sensor 3 that is frequently updated while in the lost state including when the lost state was entered, the arithmetic element 7, in the travel route generator 7e, performs correction such that the provisional travel route DR1 generated after the lost state has been entered heads toward the direction of the destination. The self position of the autonomous vehicle 1 is the latest self position of the autonomous vehicle 1 that is saved in the recorder 7h immediately before suffering poor reception of positioning information by the GNSS receiver 4. Note that, because the self position and orientation of the autonomous vehicle 1 are successively updated after the lost state is entered as described above, the vector RV regarding the direction of the destination with respect to the self position and orientation is also successively updated using information from the internal sensor 3.

Figure 13:
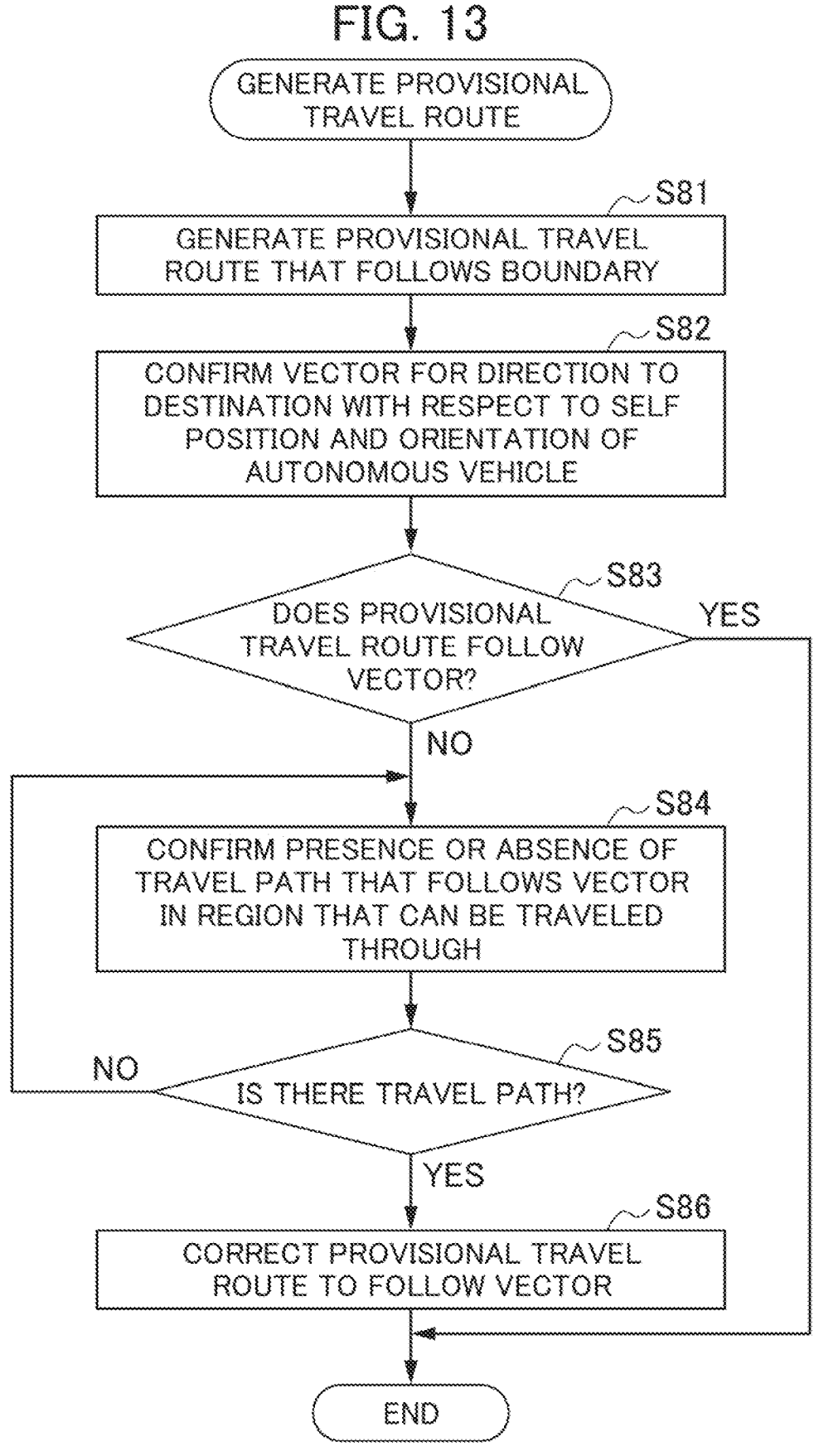
FIG. 13 is a flow chart that illustrates an example of operation by the control apparatus for the autonomous vehicle in a case of correcting a provisional travel route.

FIG. 13 illustrates an example of a flow chart for control by the arithmetic element 7 for this case. The arithmetic element 7, in the travel route generator 7e, generates the provisional travel route DR1 that follows the boundary 101a, as described above (step S81).

Next, the arithmetic element 7 confirms the vector RV, which is for the direction of the destination with respect to the current self position and orientation of the autonomous vehicle 1 (step S82). In a case where a result of the confirmation is that the provisional travel route DR1 follows the vector RV (step S83: YES), the arithmetic element 7 determines that the provisional travel route DR1 is toward the destination, and drives the autonomous vehicle 1 such that the autonomous vehicle 1 travels by following the provisional travel route DR1.

In contrast, in a case where a result of the confirmation is that the provisional travel route DR1 does not follow the vector RV (step S83: NO), the arithmetic element 7 confirms whether there is a travel path that follows the vector RV in the region that can be traveled through detected by the travelable region detector 7c (step S84). In a case where a result of the confirmation is that there is no travel path that follows the vector RV (step S85: NO), the arithmetic element 7 repeats the processing in steps S84 and S85 until a travel path that follows the vector RV is found. In a case where a result of the confirmation is that there is a travel path that follows the vector RV (step S85: YES), the arithmetic element 7 corrects the provisional travel route DR1 to follow the vector RV (step S86).

Figure 14:
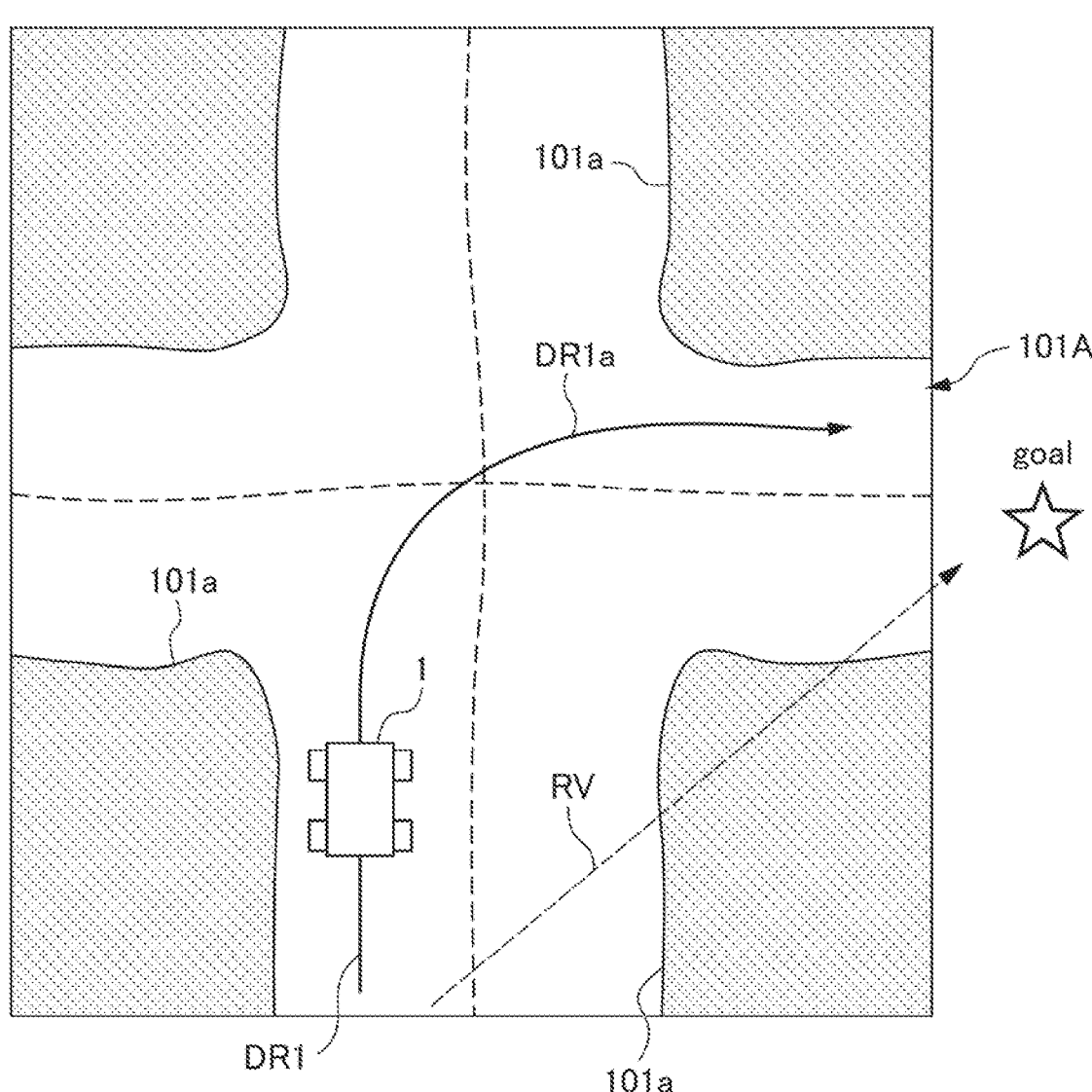
FIG. 14 is a schematic view that illustrates a case in which a provisional travel route has been corrected such that the provisional travel route follows a relative vector that faces toward a destination.

For example, in the examples illustrated in FIG. 11 and FIG. 12, the provisional travel route DR1 for the autonomous vehicle 1 should be corrected to follow the vector RV, in relation to the self position and orientation of the autonomous vehicle 1. Accordingly, in a case where, as illustrated in FIG. 14, the vector RV points to a diagonally right direction and the presence of a travel path 101A that heads toward the right has been confirmed from scene information obtained while travel is being performed following the provisional travel route DR1, a provisional travel route DR1*a* that has been corrected to turn right to head toward the travel path 101A is generated. As a result, even in a situation where there is poor situation for identification of a self position, it is possible to address establishing both of ensuring safety by advancing following a boundary 101*a* and efficiently moving to a destination.

By repeatedly correcting the provisional travel route DR1 in this manner, the direction d1 indicated by the provisional travel route DR1 over time gradually converges so as to match with the vector RV. In other words, even in a case where there is poor reception of positioning information in the GNSS receiver 4, it is possible to realize more efficient movement to a destination.

Figure 15:
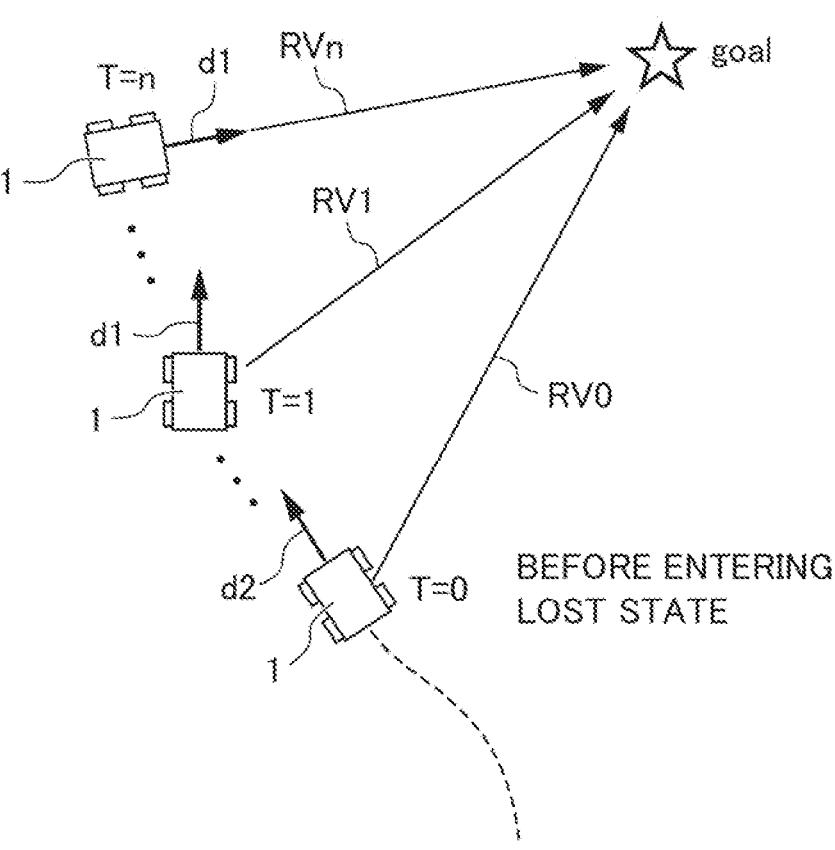
FIG. 15 is a schematic view that illustrates a relationship between relative vectors that face toward a destination, and directions indicated by corrected provisional travel routes.

FIG. 15 illustrates an example of this situation. In a case where the autonomous vehicle 1 has ceased to be able to identify the self position at a certain time (T=1) while traveling autonomously, the vector RV1 indicating the relative angle of the direction of the destination with respect to the self position and orientation of the autonomous vehicle 1 at this time can be calculated based on the self position and orientation of the autonomous vehicle 1 at the immediately prior T=0 and state information obtained by the internal sensor 3 up until T=1. In the example illustrated in FIG. 15, the vector RV1 points to a diagonally-right direction with respect to the direction d1 indicated by the provisional travel route DR1 for the autonomous vehicle 1 at T=1. The arithmetic element 7, in the travel route generator 7*e*, corrects the provisional travel route DR1 such that the provisional travel route DR1 follows the vector RV which faces toward the direction of the destination. As a result, the direction d1 indicated by the provisional travel route DR1, over time until T=n, gradually converges to match with the vector RV.

Such a correction may be executed in a case where the arithmetic element 7 has detected that a difference between the direction d1 indicated by the provisional travel route DR1 at the self position of the autonomous vehicle 1 and the angle of the vector RV has become greater than or equal to a predetermined angle.

EXPLANATION OF REFERENCE NUMERALS

1: Autonomous vehicle
2: 3D sensor
7: Arithmetic element (control apparatus)
7*c*: Travelable region detector
7*e*: Travel route generator
7*g*: Self-position identifier
100: Image information (scene information)
101: Travel path
101*a*: Boundary
200, 200A: Scene information
DR1: Provisional travel route
DR1*a*: Corrected provisional travel route
DR2: Normal travel route
MG: Safety margin from boundary
MGa: Safety margin from obstacle
d1: Direction indicated by provisional travel route
d2: Direction indicated by normal travel route
RV0, RV1, RVn: Vector (relative angle) for direction to destination with respect to self position and orientation of autonomous vehicle

What is claimed is:
1. A travel route generation method for an autonomous vehicle, the method comprising:

obtaining, by sensing surroundings of the autonomous vehicle, scene information that includes a travel path, for one frame at a predetermined sampling cycle detecting a boundary of the travel path based on the obtained scene information: using a likelihood based on machine learning to evaluate the detected boundary;

generating, based on the boundary, a provisional travel route on the travel path for the autonomous vehicle such that a safety margin is formed between the provisional travel route and the boundary, and setting a size of the safety margin in accordance with the likelihood for the boundary, wherein for a plurality of the provisional travel routes generate based on the boundary detected based on the scene information for each one frame, it is determined whether or not there is a deviation greater than or less than a preset range for amounts of deviation between the provisional travel route newly generated based on the scene information for one frame and the provisional travel route generated based on the scene information for another one frame previous to the one frame in a case where the deviation is present, the provisional travel route is updated to the provisional travel route newly generated and in a case where the deviation is not present, the provisional travel route is not updated to the provisional travel route newly generated.

2. The method according to claim 1, wherein the boundary of the travel path is detected by performing segmentation on the obtained scene information.

3. The method according to claim 1, wherein in a situation where it is possible to identify a self position of the autonomous vehicle, a normal travel route for the autonomous vehicle to a destination is generated based on the identified self position, and in a poor situation for identification of the self position of the autonomous vehicle, the provisional travel route is generated based on the boundary, and the provisional travel route is corrected based on a relative angle of a direction of the destination with respect to a self position and orientation of the autonomous vehicle immediately before the poor situation for identification of the self position was entered.

4. A control apparatus for an autonomous vehicle, the apparatus comprising:

a processor configured to detect a boundary of a travel path based on scene information that includes the travel path in relation to forward of the autonomous vehicle and is obtained by a sensor for one frame at a predetermined sampling cycle, generate, based on the boundary detected, a provisional travel route for the autonomous vehicle on the travel path, and use a likelihood based on machine learning to evaluate the boundary, wherein the processor generates the provisional travel route based on the boundary such that a safety margin is formed between the provisional travel route and the boundary, and sets a size of the safety margin in accordance with the likelihood for the boundary, for a plurality of the provisional travel routes generated based on the boundary detected based on the scene information for each one frame, the processor determines whether or not there is a deviation greater than or less than a preset range for amounts of deviation, between the provisional travel route newly generated based on the scene information for one frame and the provisional travel route generated based on the scene information for another one frame previous to the one frame, in a case where the deviation is present, the processor updates the provisional travel route to the provisional travel route newly generated, and in a case where the deviation is not present, the processor does not update the provisional travel route to the provisional travel route newly generated.

5. The control apparatus according to claim 4, wherein the processor detects the boundary of the travel path by performing segmentation on the scene information obtained by the sensor.

6. The control apparatus according to claim 4, wherein the processor is further configured to identify a self position of the autonomous vehicle, generate, in a situation where the processor can identify the self position, a normal travel route to a destination based on the identified self position of the autonomous vehicle, and generate, in a poor situation for identification of the self position by the processor, the provisional travel route based on the boundary and correct the provisional travel route based on a relative angle of a direction of the destination with respect to a self position and orientation of the autonomous vehicle immediately before the poor situation for identification of the self position was entered.

* * * * *